US010047809B2

(12) United States Patent
Banks (10) Patent No.: US 10,047,809 B2
(45) Date of Patent: Aug. 14, 2018

(54) DRUM BRAKE DUST SHIELD FOR A VEHICLE BRAKING SYSTEM

(71) Applicant: Bendix Spicer Foundation Brake LLC, Elyria, OH (US)

(72) Inventor: Daniel E Banks, Climax, MI (US)

(73) Assignee: Bendix Spicer Founation Brake LLC, Elyria, OH (US)

(*) Notice: Subject to any disclaimer, the term of this patent is extended or adjusted under 35 U.S.C. 154(b) by 0 days.

(21) Appl. No.: 15/362,881

(22) Filed: Nov. 29, 2016

(65) Prior Publication Data
US 2018/0149217 A1    May 31, 2018

(51) Int. Cl.
*F16D 65/00*    (2006.01)
*F16D 51/00*    (2006.01)

(52) U.S. Cl.
CPC .... *F16D 65/0025* (2013.01); *F16D 2051/005* (2013.01)

(58) Field of Classification Search
CPC ............ F16D 65/0025; F16D 2051/005
USPC ........................................ 188/218 A
See application file for complete search history.

(56) References Cited

U.S. PATENT DOCUMENTS

| | | | | |
|---|---|---|---|---|
| 2,850,266 A | * | 9/1958 | Merrick | F25B 15/06 165/265 |
| 4,155,601 A | * | 5/1979 | Ito | B60B 7/00 188/218 A |
| 4,164,273 A | | 8/1979 | McElroy | |
| 4,253,552 A | * | 3/1981 | Shibatani | B60T 1/065 188/2 R |
| 4,257,498 A | * | 3/1981 | Nogami | F16D 55/22 188/218 A |
| 4,540,069 A | * | 9/1985 | Bolenbaugh | B60T 1/065 188/218 A |
| 6,073,734 A | | 6/2000 | Davison | |

(Continued)

FOREIGN PATENT DOCUMENTS

JP    2010185504 A  *  8/2010

OTHER PUBLICATIONS

Machine Translation in English for JP 2010-185504-A; Inventor: Matsuo; 4 pages; Retrieve Date: Nov. 28, 2017.*

(Continued)

*Primary Examiner* — Thomas J Williams
*Assistant Examiner* — Mariano Sy
(74) *Attorney, Agent, or Firm* — Cheryl L. Greenly; Brian E. Kondas; Eugene E. Clair (57) ABSTRACT

A drum brake dust shield is provided for a vehicle braking system having a drum brake assembly. The dust shield comprises a first semicircular portion lying in a generally flat plane, and a second semicircular portion lying in the same plane as the first portion to form an annular disc. A dividing slit is defined between the first and second portions. The dust shield further comprises a hinge portion interconnecting the first and second portions. The hinge portion has a stress-relief slit that transversely intersects the dividing slit such that mechanical stresses between the first and second portions are distributed and dispersed over a relatively larger surface area when the first and second portions are spread apart along the dividing slit in opposite directions relative to each other to install the dust shield on the drum brake assembly.

20 Claims, 11 Drawing Sheets

(56) References Cited

U.S. PATENT DOCUMENTS

| | | | |
|---|---|---|---|
| 6,371,569 B1 * | 4/2002 | Dean | B60B 7/061 |
| | | | 188/218 A |
| 9,132,820 B2 | 9/2015 | Plantan | |
| 2005/0212357 A1 * | 9/2005 | Adams | B60T 17/18 |
| | | | 303/122.03 |
| 2008/0047745 A1 | 2/2008 | Smeltz | |
| 2015/0003765 A1 * | 1/2015 | Inoue | F16D 65/12 |
| | | | 384/477 |
| 2015/0345330 A1 | 12/2015 | Budnick | |

OTHER PUBLICATIONS

Fleet Products, Ltd RA600 Dust Shield; Published Date: Oct. 10, 2016; one page.*

* cited by examiner

DRUM BRAKE DUST SHIELD FOR A VEHICLE BRAKING SYSTEM

BACKGROUND

The present application relates to vehicle braking systems, and is particularly directed to a drum brake dust shield for a vehicle braking system, such as a heavy vehicle braking system that includes a drum brake assembly.

A typical drum brake assembly of a heavy vehicle, such as a truck, includes a brake shoe that engages a wheel drum to transmit braking torque through a brake spider to an axle. One end of the brake shoe is pivotable against an anchor pin that is attached to one side of the brake spider. A cam follower roller is disposed at the other end of the brake shoe. When a service brake application occurs, a camshaft located on an opposite side of the brake spider is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, brake lining of the brake shoe frictionally engages the wheel drum to transmit braking torque through the brake spider to the axle and thereby to decelerate and brake the vehicle.

In some heavy vehicles, components within the drum brake assembly are protected from debris (e.g., road debris) so that the debris does not interfere with operation of the drum brake assembly during a service brake application. Typically, a thin-metal dust shield with a number of mounting bolt holes is fastened with bolts to the brake spider. The dust shield fills open gaps between the brake spider and the wheel drum to prevent debris from reaching the components within the drum brake assembly and thereby to prevent the debris from interfering with operation of the drum brake assembly.

The dust shield may be in the form of a single-piece annular disc that is often split almost entirely down the middle with a slit. The slit allows the dust shield to be spread apart along the slit for installation between the brake spider and the wheel drum after the brake spider and the wheel drum have already been installed on the axle. The spreading apart of the dust shield can sometimes cause enough mechanical stresses on the material at the end of the slit to yield the material of the single-piece annular disc and initiate a crack.

The crack in the material at the end of the slit can propagate until the dust shield eventually breaks apart into two pieces due to deflections of the brake spider causing deflections of the dust shield as the drum brakes are being applied during service life of the drum brake assembly. If the dust shield were to break into two pieces, the mechanical stresses on the material of the two broken pieces in the areas of the mounting bolt holes increase due to vibration loads. These mechanical stresses could increase to a level that causes loss of structural integrity of the material in the areas of the mounting bolt holes, which could then result in one or both of the broken pieces of the dust shield detaching from the brake spider and falling off of the vehicle. It would be desirable to overcome drawbacks of known drum brake dust shields.

SUMMARY

In accordance with one example embodiment, a drum brake dust shield is provided for a vehicle braking system having a drum brake assembly. The drum brake dust shield comprises a first semicircular portion lying in a generally flat plane, and a second semicircular portion lying in the same plane as the first semicircular portion to form an annular disc. A dividing slit is defined between the first and second semicircular portions. The drum brake dust shield further comprises a hinge portion interconnecting the first and second semicircular portions at one end of the dividing slit. The hinge portion has a stress-relief slit that intersects the dividing slit and extends transverse to the dividing slit such that mechanical stresses between the first and second semicircular portions are distributed and dispersed over a relatively larger surface area when the first and second semicircular portions are spread apart along the dividing slit in opposite directions relative to each other to install the drum brake dust shield on the drum brake assembly.

In accordance with another example embodiment, a drum brake dust shield is provided for a vehicle braking system having a drum brake assembly. The drum brake dust shield comprises a first portion and a second portion adjoining the first portion to form an annular disc and defining a first slit between the first and second portions. The drum brake dust shield further comprises a third portion interconnecting the first and second portions at one end of the first slit, wherein the third portion has a second slit that intersects the first slit such that mechanical stresses between the first and second portions are more widely distributed and dispersed over the first, second, and third portions when the annular disc is opened along the first slit that is defined between the first and second portions to install the drum dust shield on the drum brake assembly.

In accordance with yet another example embodiment, a drum brake dust shield is provided for a vehicle braking system having a drum brake assembly. The drum brake dust shield comprises a first portion and a second portion adjoining the first portion to form an annular disc and defining a dividing slit between the first and second portions. The drum brake dust shield further comprises a hinge portion interconnecting the first and second portions at one end of the dividing slit and providing a first amount of mechanical load that can be withstood before the hinge portion breaks in response to the first and second portions being spread apart along the dividing slit to install the drum brake dust shield on the drum brake assembly. The drum brake dust shield also comprises surface means disposed in the vicinity of the hinge portion and for augmenting the first amount of mechanical load to provide a second amount of mechanical load that can be withstood before the hinge portion breaks in response to the first and second portions being spread apart along the dividing slit to install the drum brake dust shield on the drum brake assembly. The second amount of mechanical load is greater than the first amount of mechanical load.

DETAILED DESCRIPTION

Figure 1A:
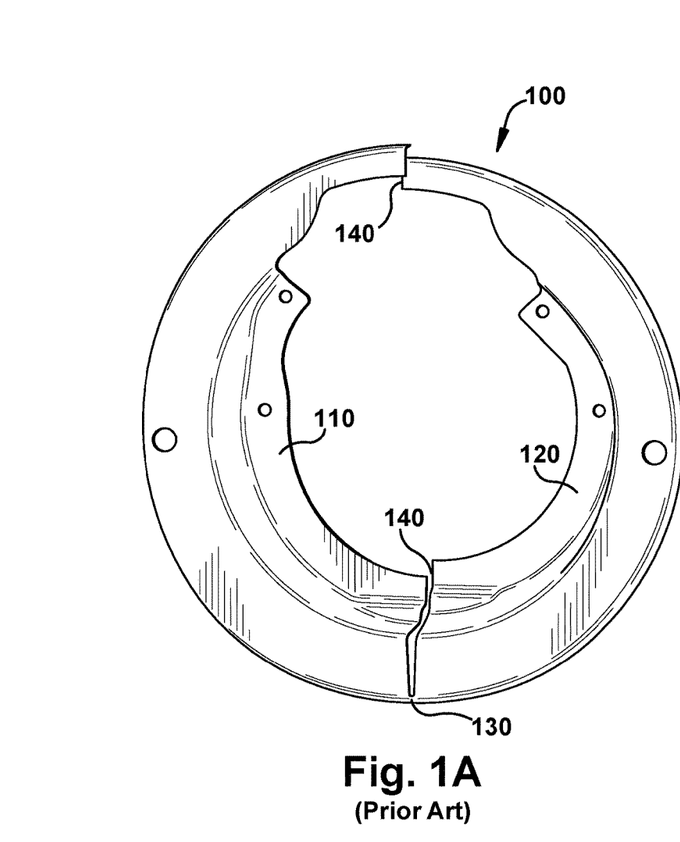
FIG. 1A is a perspective view of a prior art drum brake dust shield.
Figure 1B:
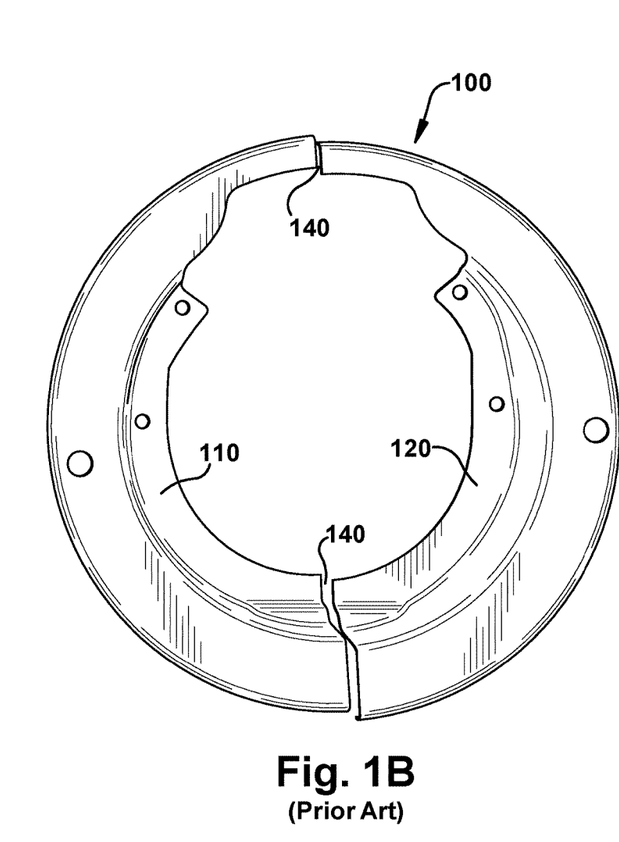
FIG. 1B is a perspective of the prior art drum brake dust shield of FIG. 1A broken in two pieces.

Referring to FIGS. 1A and 1B, perspective views of a prior art drum brake dust shield 100 are illustrated. Dust shield 100 is in the form of a single-piece annular disc having first half portion 110 and second half portion 120. Dividing slit 140 extends almost entirely down the middle between first and second half portions 110, 120. Dividing slit 140 allows dust shield 100 to be spread apart along dividing slit 140 for installation between a brake spider (not shown in FIGS. 1A and 1B) and a wheel drum (also not shown). The spreading apart of dust shield 100 can sometimes cause enough mechanical stresses on the material located at end 130 (FIG. 1A) of dividing slit 140 to yield the material and initiate a crack. A crack in the material at end 130 of dividing slit 140 can propagate until dust shield 100 eventually breaks apart into two pieces (as shown in FIG. 1B) due to deflections of the brake spider causing deflections of dust shield 100 as the drum brakes are being applied during service life of the drum brake assembly.

Figure 2:
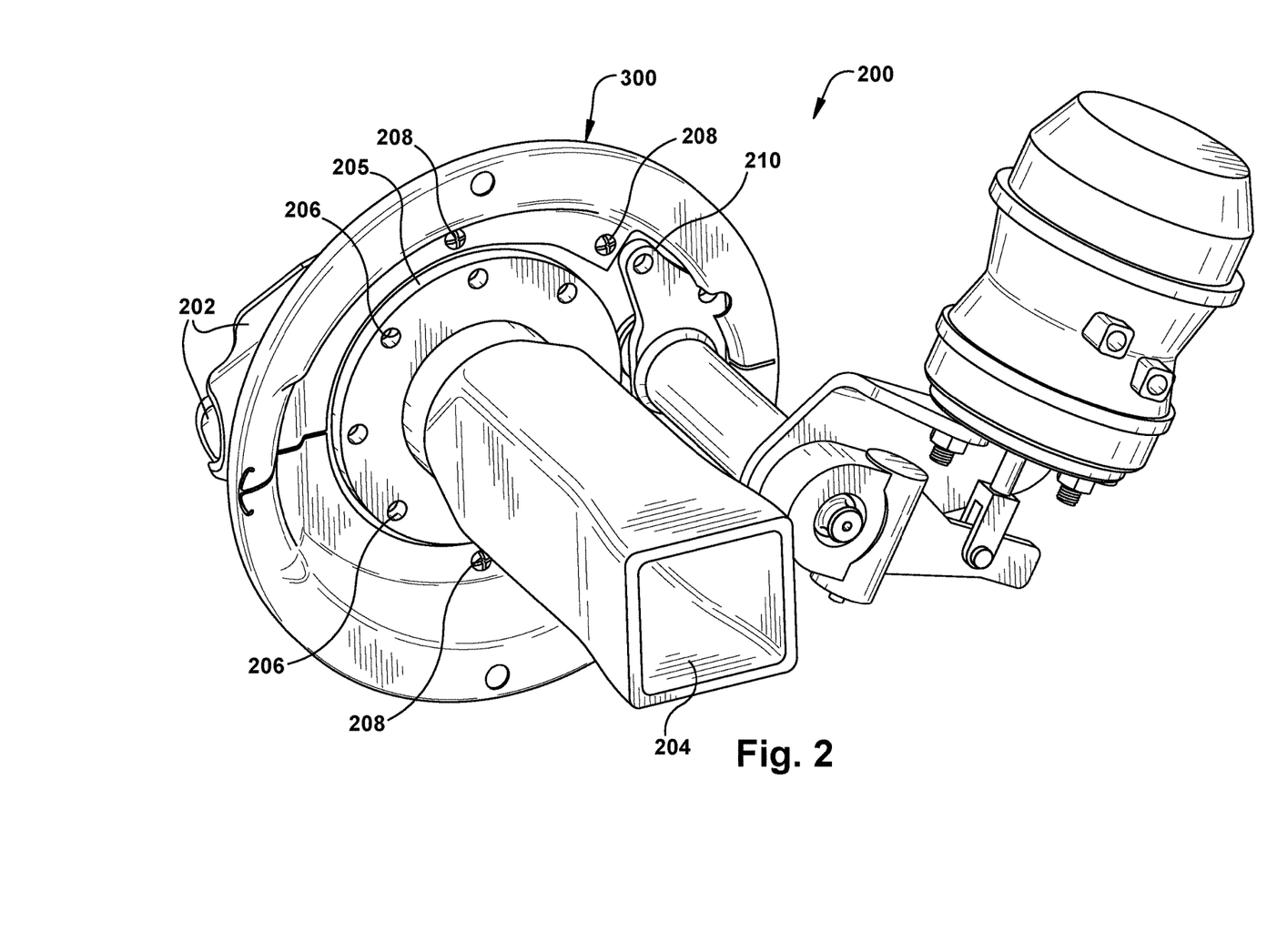
FIG. 2 is a perspective view of an example drum brake assembly implementing a drum brake dust shield constructed in accordance with an example embodiment.

Referring to FIG. 2, a perspective view of an example drum brake assembly 200 for a vehicle braking system, such as an air braking system of a commercial vehicle like a truck, is illustrated. Drum brake assembly 200 implements drum brake dust shield 300 constructed in accordance with an example embodiment. Drum brake assembly 200 includes brake spider 202 that is fixedly mounted to axle 204 of the vehicle. More specifically, axle 204 includes brake mounting flange 205 that has a number of mounting bolt holes 206 through which a number of bolts (not shown in FIG. 2) fixedly secure brake spider 202 to brake mounting flange 205 of axle 204. Dust shield 300 is fastened with a number of mounting screws (only three screws 208 shown in FIG. 2) to brake spider 202. Dust shield 300 fills open gaps between brake spider 202 and wheel drum (not shown) to prevent debris from reaching components (e.g., brake shoe 210) located within drum brake assembly 200. Dust shield 300 prevents debris from interfering with operation of components of drum brake assembly 200 during service life of drum brake assembly 200.

Figure 3A:
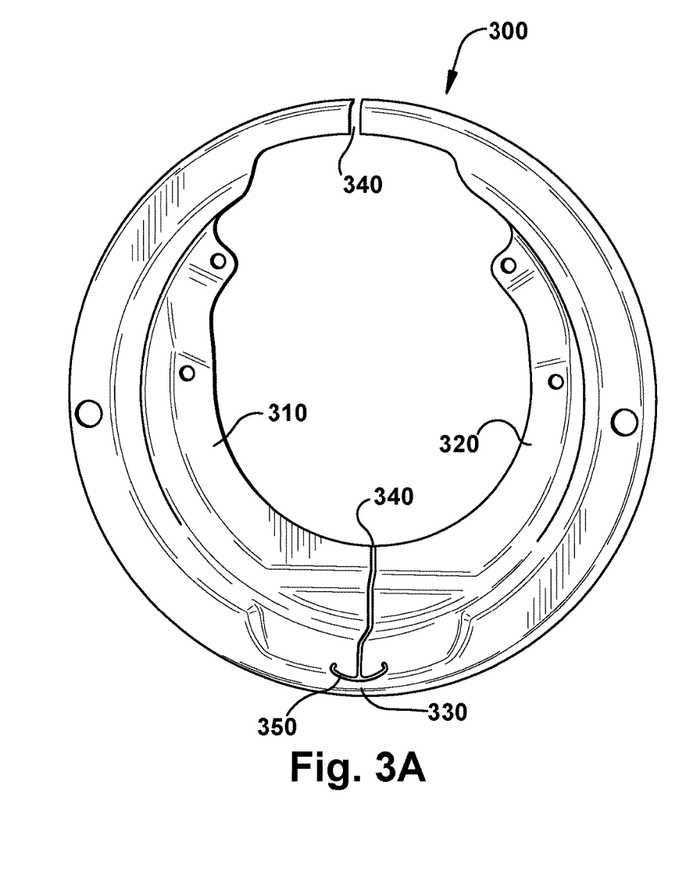
FIG. 3A is a perspective view of the example drum brake dust shield shown in FIG. 2.
Figure 3B:
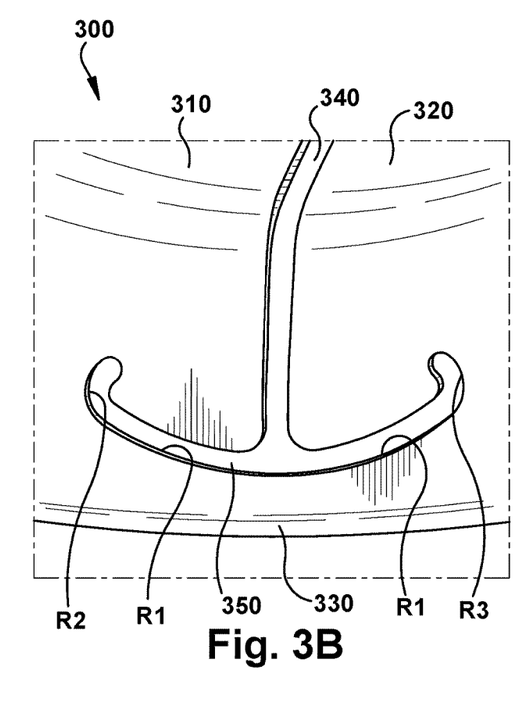
FIG. 3B is an enlarged portion of the drum brake dust shield of FIG. 3A.

Referring to FIGS. 3A and 3B, drum brake dust shield 300 comprises first portion 310 and second portion 320 adjoining first portion 310 to form an annular disc. Each of first and second portions 310, 320 is a semicircular portion lying in a generally flat plane of the annular disc. First slit 340 in the form of a partially dividing slit is defined between first and second portions 310, 320.

Dust shield 300 further comprises third portion 330 in the form of a hinge interconnecting the first and second portions 310, 320 at end of first slit 330. Third portion 330 has second slit 350 in the form of a lateral stress-relief slit that intersects first slit 340. Second slit 350 extends transverse to dividing slit 340 and provides a relatively larger surface area over which mechanical stresses to the hinge (i.e., third portion 330) can be distributed and dispersed when the annular disc (i.e., first and second portions 310, 320) is opened along dividing slit 340 to install dust shield 300 on drum brake assembly 200 shown in FIG. 2.

More specifically, one end of stress-relief slit 350 projects into first portion 310, and the other end of stress-relief slit 350 projects into second portion 320. The projection of the one end of stress-relief slit 350 into first portion 310 increases the surface area of first portion 310 in the vicinity of third portion 330. Similarly, the projection of the other end of stress-relief slit 350 into second portion 320 increases the surface area of second portion 320 in the vicinity of third portion 330. As such, mechanical stresses on the hinge are more widely distributed and dispersed over a larger total amount of surface area of first, second, and third portions 310, 320, 330 when the annular disc is opened along dividing slit 340 to install dust shield 300 on drum brake assembly 200 shown in FIG. 2.

Second slit 350 of third portion 330 is a generally arcuate-shaped slit that has a first radius R1. As best shown in FIG. 3B, about half of arcuate-shaped slit 350 is formed in first portion 310, and about half of arcuate-shaped slit 350 is formed in second portion 320. The half of the arcuate-shaped slit 350 formed in first portion 310 has a second radius R2 that is smaller than the first radius R1. The second radius R2 of first portion 310 is disposed at end of the half of the arcuate-shaped slit 350 formed in first portion 310. Similarly, the half of the arcuate-shaped slit 350 formed in second portion 320 has a third radius R3 that is smaller than the first radius R1. The third radius R3 of second portion 320 is disposed at end of the half of the arcuate-shaped slit 350 formed in second portion 320. In some embodiments, the second radius R2 and the third radius R3 are about equal to each other, such as shown in FIGS. 3A and 3B.

Figure 3C:
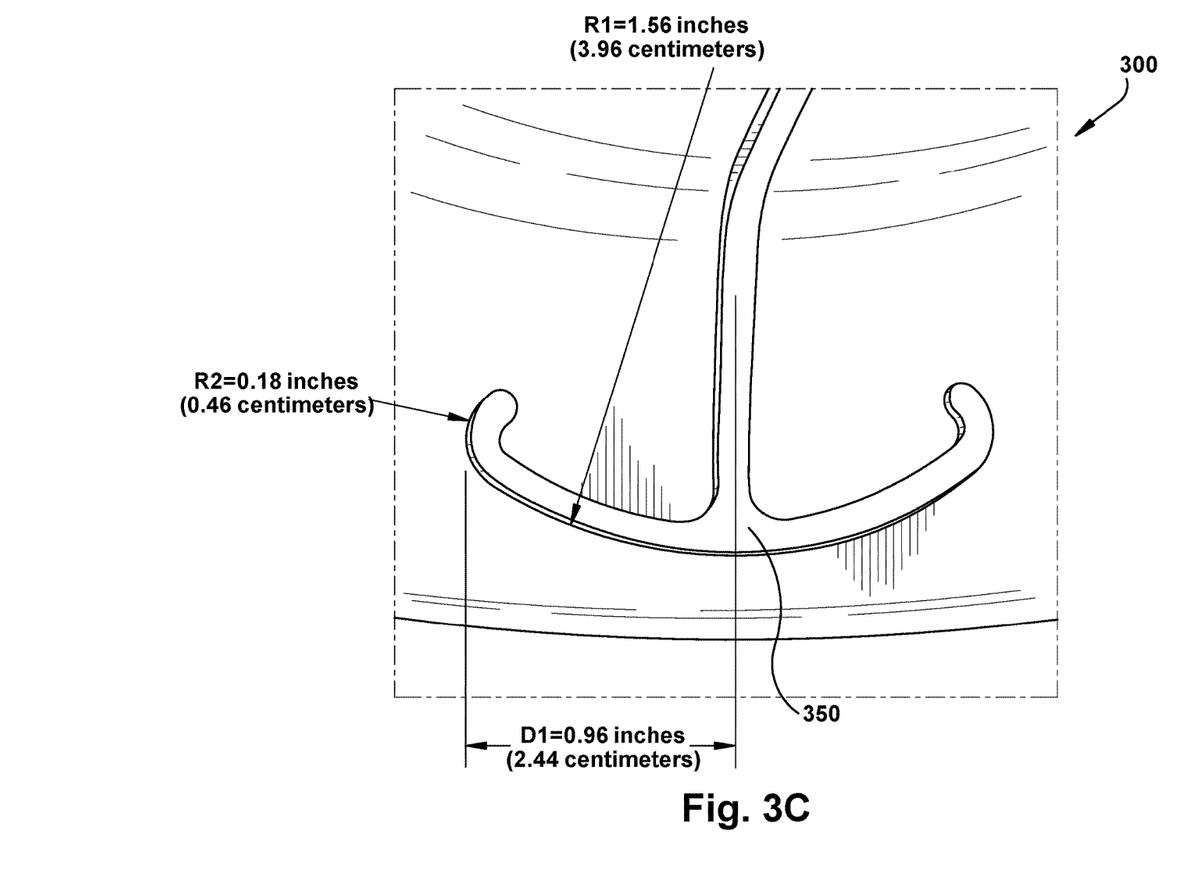
FIG. 3C is a view similar to the view of FIG. 3B, and showing geometry and certain dimensions of a stress-relief slit in the drum brake dust shield.
Figure 3D:
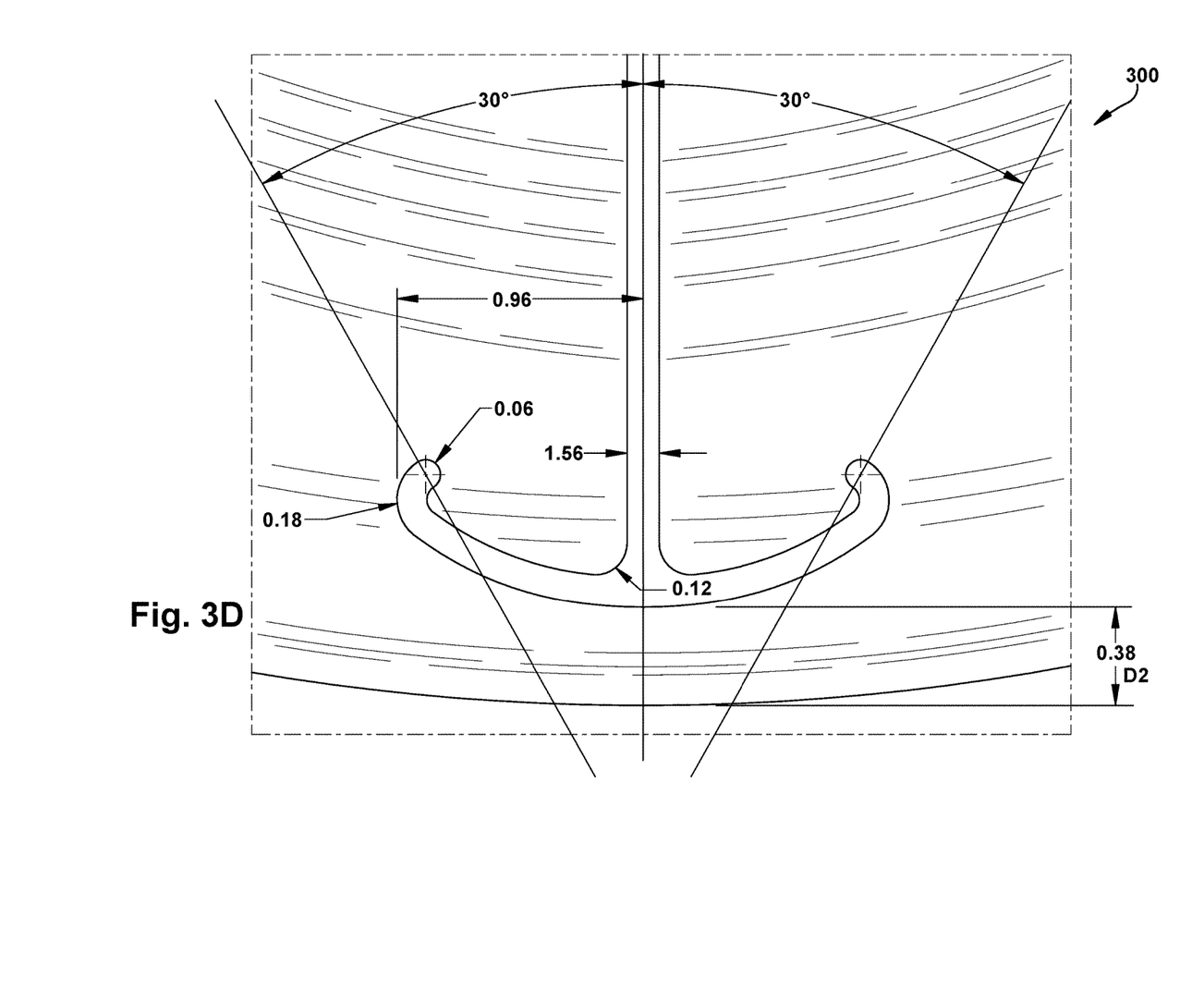
FIG. 3D is a somewhat schematic view of FIG. 3C, and showing other dimensions in relation to the certain dimensions shown in FIG. 3C.

Referring to FIGS. 3C and 3D, the example geometry and some dimensions of the arcuate-shaped slit 350 are illustrated. The example geometry and dimensions are based on a 16.5 inches (41.9 centimeters) drum brake with a dust shield that has a diameter of about 18.12 inches (46.02 centimeters). Certain dimensions illustrated include the radius R1 of 1.56 inches (3.96 centimeters), a radius R2 of 0.18 inches (0.46 centimeters), and a distance D1 of 0.96 inches (2.44 centimeters) between one end of the arcuate-shaped slit 350 and the middle of the dividing slit 340. The width of the arcuate-shaped slit 350 should be of a minimum size to prevent debris entry while large enough to allow for ease in manufacture. Another dimension illustrated (FIG. 3D only) is a distance D2 of 0.38 inches (0.97 centimeters) between bottom edge of the arcuate-shaped slit 350 and outer circumferential edge of hinge portion 330.

Figure 4A:
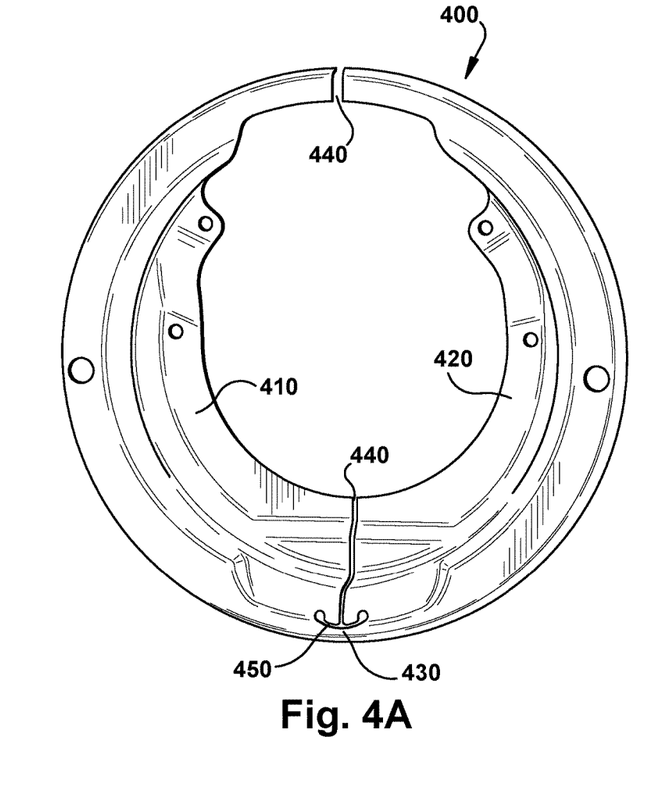
FIG. 4A is a perspective view of a drum brake dust shield constructed in accordance with another example embodiment.
Figure 4B:
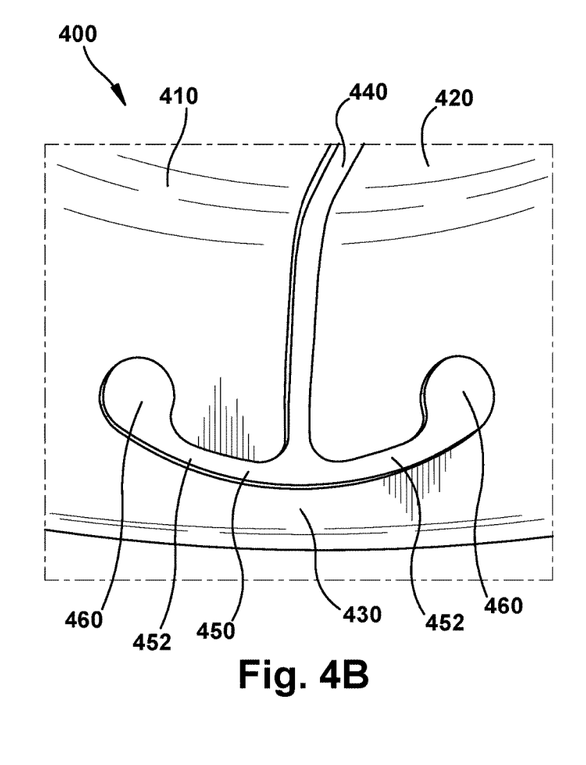
FIG. 4B is an enlarged portion of the drum brake dust shield of FIG. 4A.

Referring to FIGS. 4A and 4B, perspective views of a drum brake dust shield 400 constructed in accordance with another example embodiment are illustrated. Since the example embodiment shown in FIGS. 4A and 4B is similar to the example embodiment of FIGS. 3A and 3B, like reference numbers of FIGS. 3A and 3B are shown with numerals 100 higher in FIGS. 4A and 4B.

Stress-relief slit 450 intersects dividing slit 440 such that mechanical stresses between first and second portions 410, 420 are more widely distributed and dispersed over first, second, and third portions 410, 420, 430 when first and second portions 410, 420 are opened along dividing slit 440. As best shown in FIG. 4B, each end of stress-relief slit 450 has a somewhat bulb-shaped opening 460 communicating with main portion 452 of stress-relief slit 450.

Figure 5A:
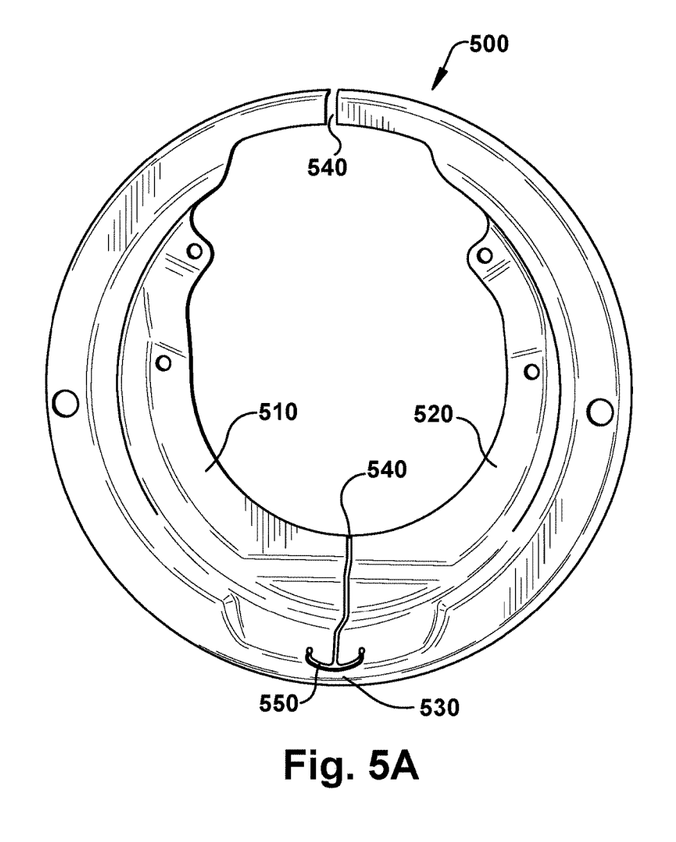
FIG. 5A is a perspective view of a drum brake dust shield constructed in accordance with another example embodiment.
Figure 5B:
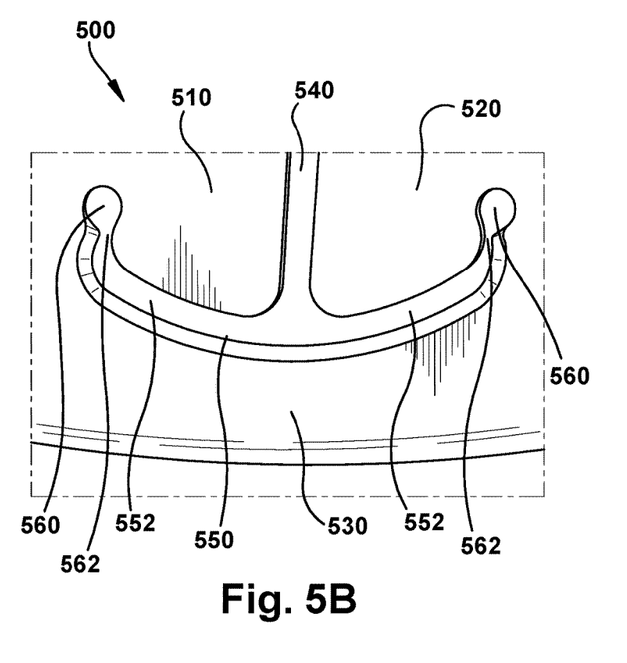
FIG. 5B is an enlarged portion of the drum brake dust shield of FIG. 5A.

Referring to FIGS. 5A and 5B, perspective views of a drum brake dust shield 500 constructed in accordance with another example embodiment are illustrated. Since the example embodiment shown in FIGS. 5A and 5B is similar to the example embodiment of FIGS. 3A and 3B, like reference numbers of FIGS. 3A and 3B are shown with numerals 200 higher in FIGS. 5A and 5B.

Stress-relief slit 550 intersects dividing slit 540 such that mechanical stresses between first and second portions 510, 520 are more widely distributed and dispersed over first, second, and third portions 510, 520, 530 when first and second portions 510, 520 are opened along dividing slit 540. As best shown in FIG. 5B, each end of stress-relief slit 550 has a somewhat bulb-shaped opening 560 communicating through a narrowing portion 562 to main portion 552 of stress-relief slit 550.

Figure 6A:
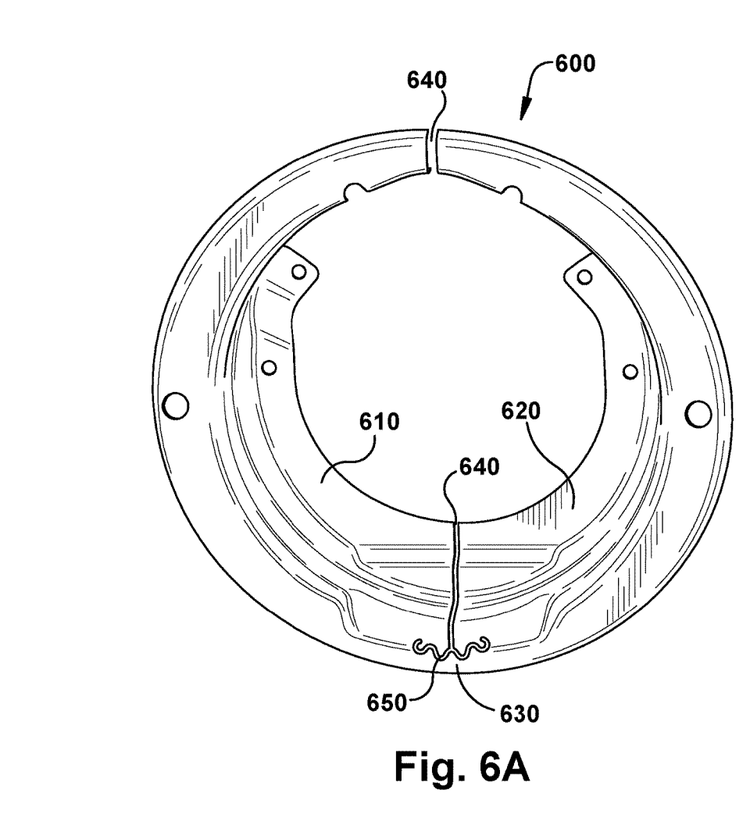
FIG. 6A is a perspective view of a drum brake dust shield constructed in accordance with another example embodiment.
Figure 6B:
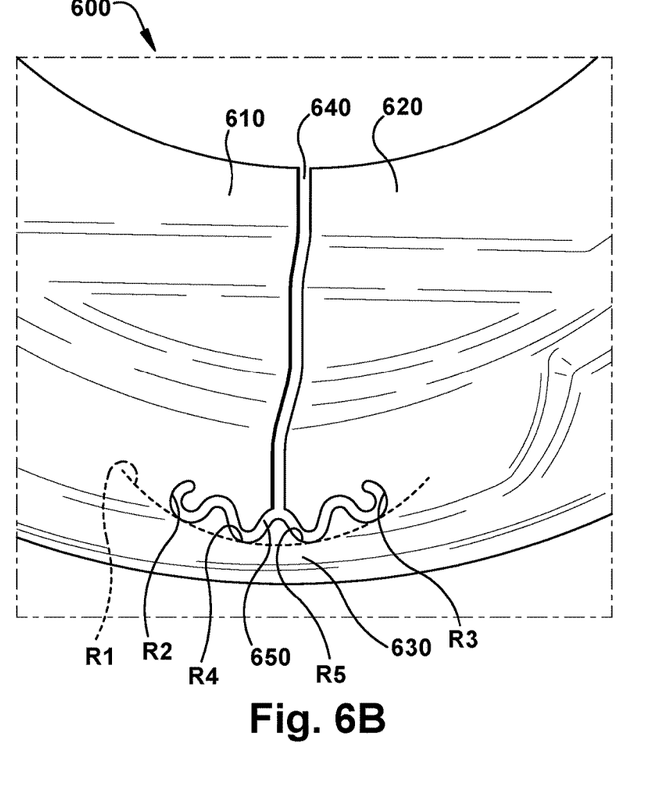
FIG. 6B is an enlarged portion of the drum brake dust shield of FIG. 6A.

Referring to FIGS. 6A and 6B perspective views of a drum brake dust shield 600 constructed in accordance with another example embodiment are illustrated. Since the example embodiment shown in FIGS. 6A and 6B is similar to the example embodiment of FIGS. 3A and 3B, like reference numbers of FIGS. 3A and 3B are shown with numerals 300 higher in FIGS. 6A and 6B.

Stress-relief slit 650 intersects dividing slit 640 such that mechanical stresses between first and second portions 610, 620 are more widely distributed and dispersed over first, second, and third portions 610, 620, 630 when first and second portions 610, 620 are opened along dividing slit 640. As best shown in FIG. 6B, each half of stress-relief slit 650 has a geometry that contains multiple arcs and radii.

Stress-relief slit 650 of hinge portion 630 is a generally arcuate-shaped slit that has a first radius R1 shown by a dashed line in FIG. 6B. The half of the stress-relief slit 650 formed in first portion 610 has a second radius R2 that is smaller than the first radius R1. The second radius R2 of first portion 610 is disposed at end of the half of the stress-relief slit 650 formed in first portion 610. Similarly, the half of the stress-relief slit 650 formed in second portion 620 has a third radius R3 that is smaller than the first radius R1. The third radius R3 of second portion 620 is disposed at end of the half of the stress-relief slit 650 formed in second portion 620. In some embodiments, the second radius R2 and the third radius R3 are about equal to each other, such as shown in FIGS. 6A and 6B.

The half of the stress-relief slit 650 formed in first portion 610 has a fourth radius R4 that is smaller than the first radius R1 and is disposed between the end of the half of the stress-relief slit 650 formed in first portion 610 and the point at which first and second portions 610, 620 intersect. Similarly, the half of the stress-relief slit 650 formed in second portion has a fifth radius R5 that is smaller than the first radius R1 and is disposed between the end of the half of the stress-relief slit 650 formed in second portion 620 and the point at which first and second portions 610, 620 intersect. In some embodiments, the second radius R2 and the third radius R3 are about equal to each other, and the fourth radius R4 and the fifth radius R5 are about equal to each other. In some embodiments, the second, third, fourth, and fifth radii R2, R3, R4, R5 are about equal to each other, such as shown in FIG. 6B.

Figure 7A:
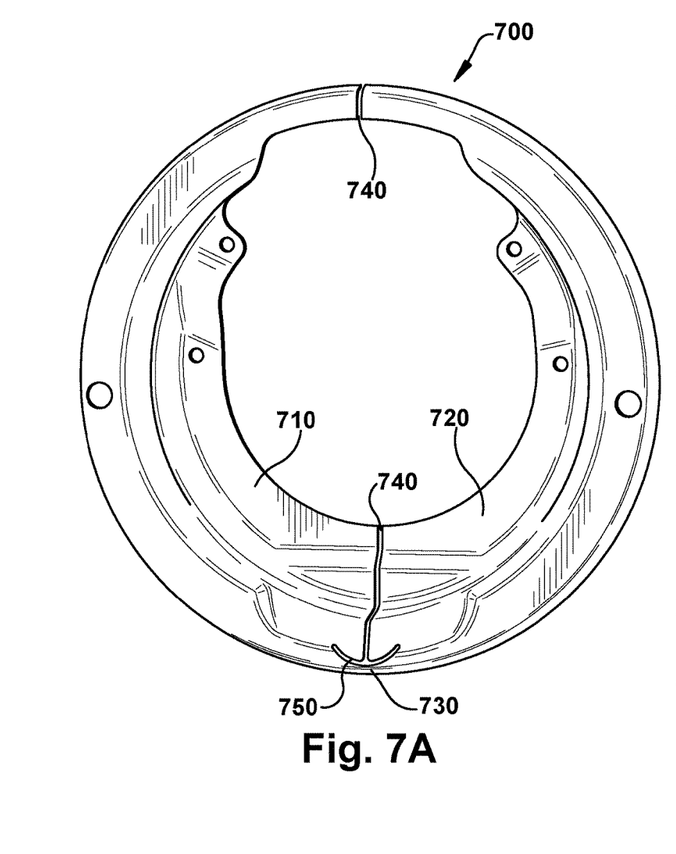
FIG. 7A is a perspective view of a drum brake dust shield constructed in accordance with another example embodiment.
Figure 7B:
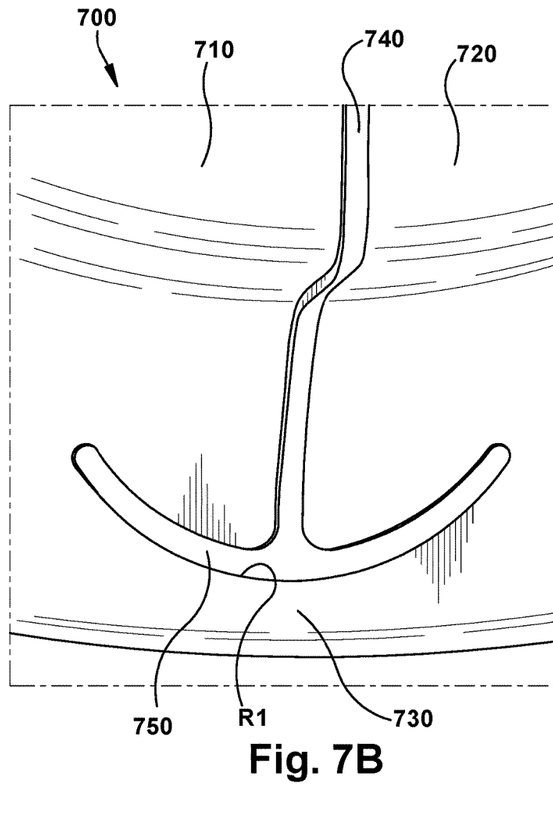
FIG. 7B is an enlarged portion of the drum brake dust shield of FIG. 7A.

Referring to FIGS. 7A and 7B, perspective views of a drum brake dust shield 700 constructed in accordance with another example embodiment are illustrated. Since the example embodiment shown in FIGS. 7A and 7B is similar to the example embodiment of FIGS. 3A and 3B, like reference numbers of FIGS. 3A and 3B are shown with numerals 400 higher in FIGS. 7A and 7B.

Stress-relief slit 750 intersects dividing slit 740 such that mechanical stresses between first and second portions 710, 720 are more widely distributed and dispersed over first, second, and third portions 710, 720, 730 when first and second portions 710, 720 are opened along dividing slit 740. As best shown in FIG. 7B, the radius R1 of stress-relief slit 750 may be the same as or different from the radius R1 of stress-relief slit 350 shown in the example embodiment of FIG. 3B. Moreover, the geometry of each end of stress-relief slit 750 shown in the example embodiment of FIGS. 7A and 7B is relatively simple as compared to the geometry of each end of stress-relief slit 350 shown in the example embodiment of FIGS. 3A and 3B. The presence of only one radius in stress-relief slit 750 shown in FIGS. 7A and 7B enables drum brake dust shield 700 to be manufactured at a relatively lower cost.

Figure 8A:
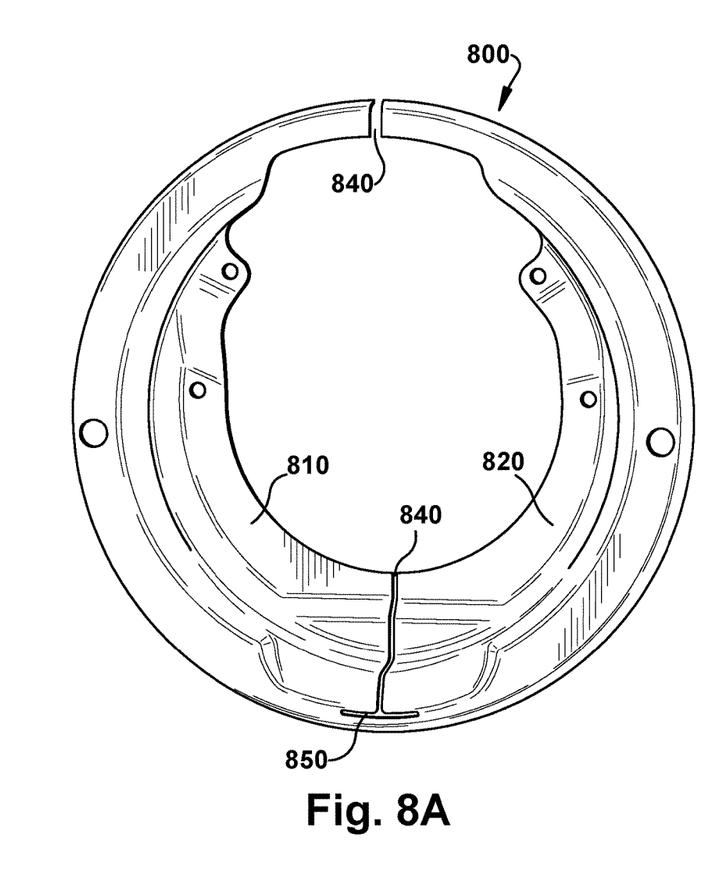
FIG. 8A is a perspective view of a drum brake dust shield constructed in accordance with another example embodiment.
Figure 8B:
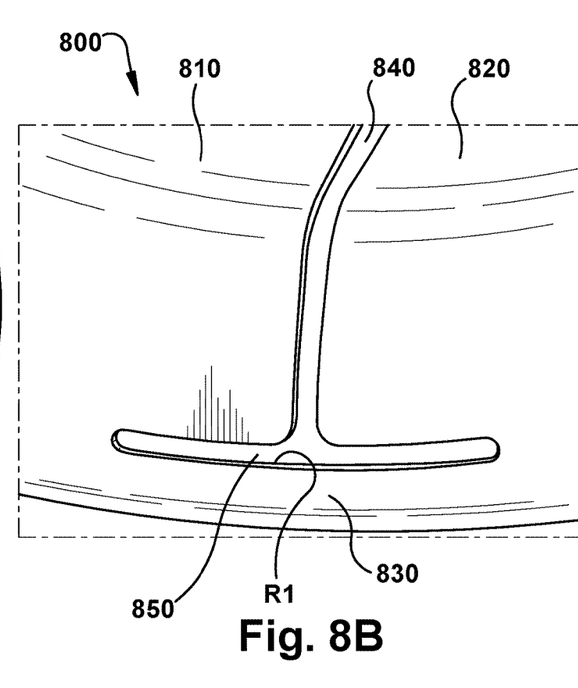
FIG. 8B is an enlarged portion of the drum brake dust shield of FIG. 8A.

Referring to FIGS. 8A and 8B, perspective views of a drum brake dust shield 800 constructed in accordance with another example embodiment are illustrated. Since the example embodiment shown in FIGS. 8A and 8B is similar to the example embodiment of FIGS. 3A and 3B, like reference numbers of FIGS. 3A and 3B are shown with numerals 500 higher in FIGS. 8A and 8B.

Stress-relief slit 850 intersects dividing slit 840 such that mechanical stresses between first and second portions 810, 820 are more widely distributed and dispersed over first, second, and third portions 810, 820, 830 when first and second portions 810, 820 are opened along dividing slit 840. As best shown in FIG. 8B, the radius R1 of stress-relief slit 850 has a larger radius as compared to the radius R1 of stress-relief slit 350 shown in the example embodiment of FIG. 3B. Moreover, the geometry of each end of stress-relief slit 850 shown in the example embodiment of FIGS. 8A and 8B is relatively simple as compared to the geometry of each end of stress-relief slit 350 shown in the example embodiment of FIGS. 3A and 3B. The presence of only one radius in stress-relief slit 850 shown in FIGS. 8A and 8B enables drum brake dust shield 800 to be manufactured at a relatively lower cost.

Figure 9A:
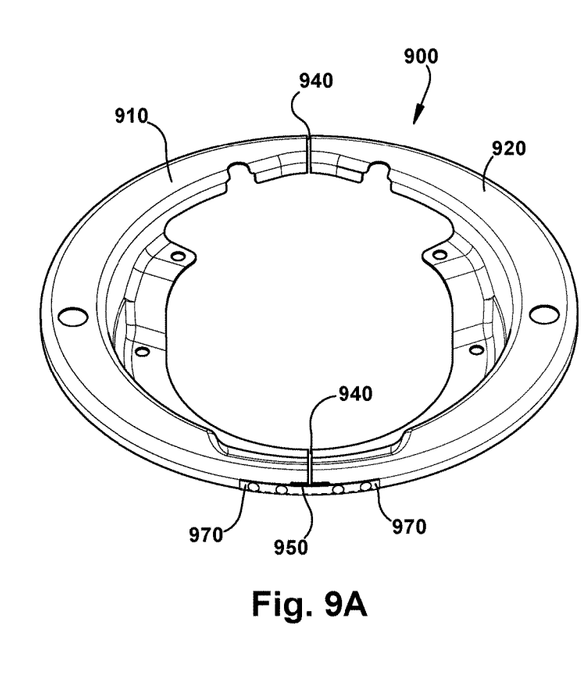
FIG. 9A is a perspective view of a drum brake dust shield constructed in accordance with another example embodiment.
Figure 9B:
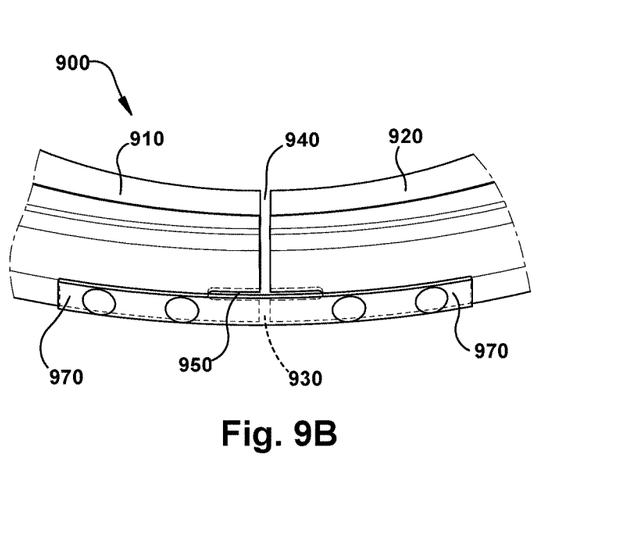
FIG. 9B is an enlarged portion of the drum brake dust shield of FIG. 9A.

Referring to FIGS. 9A and 9B, perspective views of a drum brake dust shield 900 constructed in accordance with another example embodiment are illustrated. Since the example embodiment shown in FIGS. 9A and 9B is similar to the example embodiment of FIGS. 3A and 3B, like reference numbers of FIGS. 3A and 3B are shown with numerals 600 higher in FIGS. 9A and 9B.

Stress-relief slit 950 is a generally straight slit that extends about perpendicular to dividing slit 940 defined between first and second portions 910, 920. Stress-relief slit 950 is disposed in the vicinity of an outer circumferential lip of the annular disc formed by first, second, and third portions 910, 920, 930. Stress-relief slit 950 intersects dividing slit 940 such that mechanical stresses between first and second portions 910, 920 are more widely distributed and dispersed over first, second, and third portions 910, 920, 930 when first and second portions 910, 920 are opened along dividing slit 940. The geometry of stress-relief slit 950 shown in the example embodiment of FIGS. 9A and 9B is relatively simple as compared to the geometry of stress-relief slit 350 shown in the example embodiment of FIGS. 3A and 3B. This simpler configuration of stress-relief slit 950 shown in FIGS. 9A and 9B enables drum brake dust shield 900 to be manufactured at a relatively lower cost.

Optionally, flat spring strip 970 is attached in the vicinity of hinge portion 930 to keep first and second portions 910, 920 together as a unit in the event that hinge portion 930 breaks and unable to keep first and second portions 910, 920 interconnected to each other. Spring strip 970 may comprise any type of material, such as steel, for example. Spring strip 970 may be fastened to first and second portions 910, 920 in any number of ways. For example, spring strip 970 can be welded or riveted to first and second portions 910, 920. Spring strip 970 prevents first and second portions 910, 920 from coming apart regardless of whether hinge portion 930 breaks or dust shield 900 is pre-cut into two pieces.

Although the above description describes the example embodiment of FIGS. 9A and 9B as optionally including spring strip 970, it is conceivable that other embodiments including the example embodiments disclosed herein can also optionally include a spring strip for keeping parts together in the event of a break in the hinge that interconnects the parts.

Also, although the above description of the example embodiment of FIGS. 9A and 9B describes stress-relief slit 950 as being disposed in the vicinity of the outer circumferential lip of the annular disc, it is conceivable that stress-relief slit 950 may be disposed at a different location. For example, stress-relief slit 950 could be located away from the outer circumferential lip of the annular disc and more towards the center of the annular disc. Moreover, it is conceivable that only spring strip 970 be used to hold first and second portions 910, 920 together without the use of any hinge or any stress-relief slit. If only spring strip 970 were to be used to hold first and second portions 910, 920 together, then dividing slit 940 shown in FIGS. 9A and 9B would be in the form of a fully dividing slit.

A drum brake dust shield constructed in accordance with any of the above example embodiments may comprise any type of material or combination of materials. For example, the drum brake dust shield may comprise stainless steel, spring steel, aluminum, or other metals, or a combination thereof. As another example, it is conceivable that the drum brake dust shield may comprise all plastic material.

It should be apparent that a drum brake dust shield constructed in accordance with the above-described example embodiments distributes and disperses mechanical stresses over a relatively larger surface area resulting from bending, flexing, or spreading apart of two half portions relative to each other in opposite directions so as to reduce the chance of the two halves separating apart into two pieces at a hinge portion between the two half portions. The stress-relief slit is a lateral slit that extends transverse to the dividing slit to provide the relatively larger surface area to more widely distribute and disperse the mechanical stresses.

It should be apparent that a stress-relief slit of a drum brake dust shield constructed in accordance with the above-described example embodiments provides a stress-reducing geometry that lessens stresses at a potential weak spot on a single-piece drum brake dust shield due to cyclic stresses and loads on the dust shield. These cyclic stresses and loads on the dust shield are from repeated service brake applications as well as deflections of the brake spider and the dust shield due to road vibrations. The different geometries of the stress-relief slit enable mechanical stresses and loads on the drum brake dust shield to be distributed and dispersed during service brake applications.

It should also be apparent that a number of surfaces are disposed in the vicinity of a hinge portion for augmenting a first amount of mechanical load to provide a second amount of mechanical load that can be withstood before the hinge portion breaks in response to first and second portions of the drum brake dust shield being spread apart along the dividing slit to install the drum brake dust shield on a drum brake assembly. The second amount of mechanical load is greater than the first amount of mechanical load.

It should also be apparent that a drum brake dust shield constructed in accordance with above-described example embodiments can be customized to match installation requirements of a variety of brake applications. The drum brake dust shield can be configured for a particular application by varying the contour, size, shape, cross-section, and slit width, for example, of the stress-relief slit to vary the amount of mechanical stress load that can be withstood before the drum brake dust shield breaks.

It should further be apparent that a drum brake dust shield constructed in accordance with above-described example embodiments is a simple, low-cost component that is easy to manufacture. The drum brake dust shield is cost effective and easy to install in retrofit applications as well as new production applications.

Although the above description describes the drum brake dust shield being used in a heavy vehicle such as a truck, it is conceivable that the drum brake dust shield may be used in other types of commercial vehicles, such as busses for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A drum brake dust shield for a vehicle braking system having a drum brake assembly, the drum brake dust shield comprising:
   a first semicircular portion lying in a generally flat plane;
   second semicircular portion lying in the same plane as the first semicircular portion to form an annular disc, wherein a dividing slit is substantially separating the first and second semicircular portions; and
   a hinge portion interconnecting the first and second semicircular portions at an outer circumference of the drum brake dust shield, wherein the hinge portion has a stress-relief slit that intersects a termination of the dividing slit and extends transverse to the dividing slit such that mechanical stresses between the first and second semicircular portions are distributed and dispersed over a relatively larger surface area when the first and second semicircular portions are spread apart along the dividing slit in opposite directions relative to each other to install the drum brake dust shield on the drum brake assembly.

2. A drum brake dust shield according to claim 1, wherein the stress-relief slit of the hinge portion is a generally arcuate-shaped slit that has a first radius.

3. A drum brake dust shield according to claim 2, wherein (i) about half of the arcuate-shaped slit is formed in the first semicircular portion, and (ii) about half of the arcuate-shaped slit is formed in the second semicircular portion.

4. A drum brake dust shield according to claim 3, wherein each half of the arcuate-shaped slit formed in the first and second semicircular portions has a second radius that is smaller than the first radius.

5. A drum brake dust shield according to claim 4, wherein (i) the second radius associated with the first semicircular portion is disposed at end of the half of the arcuate-shaped slit formed in the first semicircular portion, and (ii) the second radius associated with the second semicircular portion is disposed at end of the half of the arcuate-shaped slit formed in the second semicircular portion.

6. A drum brake dust shield according to claim 4, wherein (i) the second radius associated with the first semicircular portion is distal from the point at which the dividing slit and the stress-relief slit intersect, and (ii) the second radius associated with the second semicircular portion is distal from the point at which the dividing slit and the stress-relief slit intersect.

7. A drum brake dust shield according to claim 1, wherein the stress-relief slit of the hinge portion is a generally straight slit that extends about perpendicular to the dividing slit that is defined between the first and second semicircular portions.

8. A drum brake dust shield according to claim 1, further comprising a spring strip attached in the vicinity of the hinge portion to keep the first and second semicircular portions together as a unit in the event that the hinge portion breaks and unable to keep the first and second semicircular portions interconnected to each other.

9. A drum brake dust shield for a vehicle braking system having a drum brake assembly, the drum brake dust shield comprising:
   a first portion;
   a second portion adjoining the first portion to form an annular disc and a first slit substantially separating the first and second portions; and
   a third portion interconnecting the first and second portions at an outer circumference of the drum brake dust shield, wherein the third portion has a second slit that intersects a termination of the first slit such that mechanical stresses between the first and second portions are more widely distributed and dispersed over the first, second, and third portions when the annular disc is opened along the first slit that is defined between the first and second portions to install the drum dust shield on the drum brake assembly.

10. A drum brake dust shield according to claim 9, wherein the first slit of the third portion is a generally arcuate-shaped slit that has a first radius.

11. A drum brake dust shield according to claim 10, wherein (i) about half of the arcuate-shaped slit is formed in the first portion, and (ii) about half of the arcuate-shaped slit is formed in the second portion.

12. A drum brake dust shield according to claim 11, wherein (i) the half of the arcuate-shaped slit formed in the first portion has a second radius that is smaller than the first radius, and (ii) the half of the arcuate-shaped slit formed in the second portion has a third radius that is smaller than the first radius.

13. A drum brake dust shield according to claim 12, wherein (i) the second radius of the first portion is disposed at end of the half of the arcuate-shaped slit formed in the first portion, and (ii) the third radius of the second portion is disposed at end of the half of the arcuate-shaped slit formed in the second portion.

14. A drum brake dust shield according to claim 13, wherein the second radius and the third radius are about equal to each other.

15. A drum brake dust shield according to claim 14, wherein (i) the half of the arcuate-shaped slit formed in the first portion has a fourth radius that is smaller than the first radius and is disposed between the end of the half of the arcuate-shaped slit formed in the first portion and the point at which the first and second portions intersect, and (ii) the half of the arcuate-shaped slit formed in the second portion has a fifth radius that is smaller than the first radius and is disposed between the end of the half of the arcuate-shaped slit formed in the second portion and the point at which the first and second portions intersect.

16. A drum brake dust shield according to claim 15, wherein (i) the second radius and the third radius are about equal to each other, and (ii) the fourth radius and the fifth radius are about equal to each other.

17. A drum brake dust shield according to claim 9, wherein the second slit of the third portion is a generally straight slit that extends about perpendicular to the first slit defined between the first and second portions.

18. A drum brake dust shield according to claim 9, further comprising a spring strip attached in the vicinity of the third portion to keep the first and second portions together as a unit in the event that the third portion breaks and unable to keep the first and second portions interconnected to each other.

19. A drum brake dust shield for a vehicle braking system having a drum brake assembly, the drum brake dust shield comprising:
   a first portion;
   a second portion adjoining the first portion to form an annular disc and a dividing slit substantially separating the first and second portions;
   a hinge portion interconnecting the first and second portions at an outer circumference of the drum brake dust shield and providing a first amount of mechanical load that can be withstood before the hinge portion breaks in response to the first and second portions being spread apart along the dividing slit to install the drum brake dust shield on the drum brake assembly; and
   surface means comprising a number of surfaces of the first and second portions defining a stress-relief slit having a generally arcuate-shape and extending transverse to a termination of the dividing slit for augmenting the first amount of mechanical load to provide a second amount of mechanical load that can be withstood before the hinge portion breaks in response to the first and second portions being spread apart along the dividing slit to install the drum brake dust shield on the drum brake assembly, wherein the second amount of mechanical load is greater than the first amount of mechanical load.

20. A drum brake dust shield according to claim 19, wherein the surface means comprises a number of surfaces of the first and second portions defining the stress-relief slit that is a generally straight slit and extends about perpendicular to the dividing slit.

* * * * *